United States Patent Office.

IMPROVED COMPOUND OIL FOR PAINT, &c.

DARIUS S. ROBINSON, OF OSWEGO, NEW YORK.

Letters Patent No. 60,557, dated December 18, 1866.

*The Schedule referred to in these Letters Patent and making part of the same.*

TO ALL WHOM IT MAY CONCERN:

Be it known that I have invented a new and improved mode, manner, and process of mixing, combining, and compounding the following articles or ingredients, to wit: petroleum, rock or lubricating oil, linseed oil, India rubber, beeswax, gutta percha, sulphate of zinc, sugar of lead. And I do hereby declare that the following is a full and accurate description of the mode and manner of mixing, combining, and compounding the aforesaid ingredients.

The nature of my invention consists in mixing, combining, and compounding the aforesaid articles or ingredients, and making a liquid compound or composition, possessing the quality and answering the purpose of pure linseed oil, or other oils to be used and employed in the mixture of paints in the place of pure linseed or other oils, and to be used for all other purposes in the place and stead of pure linseed oil or other pure oils, and which said liquid compound or composition I designate and call Elastic Oil; and to enable others to make and use my invention, I will proceed to describe the process of making and manufacturing said liquid compound or composition: I take the aforesaid ingredients in the proportions following, that is to say, petroleum, rock, or lubricating oil, six ounces; linseed oil, two ounces; India rubber, one-sixteenth ($\frac{1}{16}$) of an ounce; beeswax, one-twenty-fourth ($\frac{1}{24}$) of an ounce; gutta percha, one-sixteenth ($\frac{1}{16}$) of an ounce; sulphate of zinc, one-twentieth ($\frac{1}{20}$) of an ounce; sugar of lead, one-thirty-second ($\frac{1}{32}$) of an ounce. And first put the linseed oil in a kettle and heat it a little, and then add the India rubber and heat sufficiently hot to melt and dissolve the rubber; then add the beeswax and gutta percha, and boil until the compound is completely melted and dissolved and becomes a liquid; then gradually add the petroleum, rock, or lubricating oil while boiling; and lastly add the sulphate of zinc and sugar of lead, while still boiling, stirring vigorously during the time. When cooled it is ready for use, and forms the liquid compound or composition called elastic oil. Sometimes I vary the quantities of said ingredients as I wish to make the said elastic oil heavier or lighter, as the case may be.

What I claim by my invention, is the art of mixing, combining, and compounding the aforesaid articles or ingredients, and making a liquid compound or composition, called and designated by me elastic oil, possessing the qualities and answering the purposes of pure linseed oil, or other pure oils, to be used in painting and all other general purposes for which linseed oil and other pure oils are used.

D. S. ROBINSON.

Witnesses:
W. A POUCHER,
C. J. ROBINSON.